United States Patent
Scheel et al.

(10) Patent No.: US 6,912,493 B1
(45) Date of Patent: Jun. 28, 2005

(54) TECHNIQUE FOR CONFIGURING PROCESSORS IN SYSTEM WITH LOGICAL PARTITIONS

(75) Inventors: Jeffrey Jay Scheel, Rochester, MN (US); Dennis James Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 09/672,043

(22) Filed: Sep. 29, 2000

(51) Int. Cl.[7] .............................. G06F 9/46; G06F 9/45; G06F 7/60

(52) U.S. Cl. ............................ 703/2; 703/22; 718/102; 718/105

(58) Field of Search ................................ 703/2, 13, 22; 718/102, 105; 709/223, 104, 105, 106

(56) References Cited

U.S. PATENT DOCUMENTS

| | | | |
|---|---|---|---|
| 4,843,541 A | 6/1989 | Bean et al. ................. 364/200 |
| 5,095,427 A | 3/1992 | Tanaka et al. | |
| 5,325,525 A | 6/1994 | Shan et al. | |
| 5,325,526 A | 6/1994 | Cameron et al. | |
| 5,357,632 A | 10/1994 | Pian et al. | |
| 5,504,670 A | 4/1996 | Barth et al. | |
| 5,535,321 A | * 7/1996 | Massaro et al. ............ 345/707 |
| 5,574,914 A | 11/1996 | Hancock et al. | |
| 5,659,786 A | 8/1997 | George et al. .............. 395/653 |
| 5,692,193 A | 11/1997 | Jagannathan et al. | |
| 5,872,963 A | 2/1999 | Bitar et al. | |
| 6,199,093 B1 | 3/2001 | Yokoya | |
| 6,247,109 B1 | 6/2001 | Kleinsorge et al. | |
| 6,269,391 B1 | 7/2001 | Gillespie | |
| 6,418,460 B1 | 7/2002 | Bitar et al. | |
| 6,542,926 B2 | 4/2003 | Zalewski et al. | |
| 6,587,938 B1 | * 7/2003 | Eilert et al. .................... 712/29 |
| 6,598,069 B1 | 7/2003 | Rooney et al. | |
| 6,625,638 B1 | * 9/2003 | Kubala et al. .............. 709/105 |
| 6,647,508 B2 | 11/2003 | Zalewski et al. | |
| 2001/0014905 A1 | 8/2001 | Onodera | |
| 2003/0014466 A1 | 1/2003 | Berger et al. | |

OTHER PUBLICATIONS

Menasce, D. et al. Capacity Planning and Performance Modeling. ISBN 0–13–035494–5. © 1994.*

Leutenegger et al. "A Modeling Study of the TPC–C Benchmark". Proc. of the 1993 ACM SIGMOD Int'l Conf. on Management of Data. 1993. pp. 22–31.*

Levine, C. "Order–of–Magnitude Advantage on TPC–C Through Massive Parallelism." Proc. of the 1995 ACM SIGMOD Int'Conf. on Management of Data. 1995. pp. 22–31.*

(Continued)

Primary Examiner—Kevin J. Teska
Assistant Examiner—Ayal Sharon
(74) Attorney, Agent, or Firm—Christopher H. Lynt; Owen J. Gamon

(57) ABSTRACT

Configuring processors in a target system includes' prompting a user to select workload units to use in the configuration, prompting the user to input a quantity of processing power required in terms of partition workload capacity required, obtaining a system work capacity for the target system in the appropriate units from a look-up table, and calculating the number of partition processors. The number of partition processors equals the total number of system processors, times the partition workload capacity divided by the system work capacity. The calculated number of partition processors is tested to see if it is within a predetermined percentage of the next full processor increment. If within the predetermined percentage, then using dedicated processors is recommended, otherwise using shared processors is recommended. The calculated number of partition processors and the recommended use of shared or dedicated processors is displayed to the user for validation or changing of the values. After validation, the processors are configured according to the settings determined by the routine.

14 Claims, 2 Drawing Sheets

OTHER PUBLICATIONS

IBM Corp., "AS/400 Logical Partitions Hardware Planning Guide." © 1999.*

Schimunek, G. et al. Slicing the AS/400 with Locigal Partitioning : A How to Guide. Aug. 1999.*

IBM Corp., LPAR Configuration and Management. First Edition © Apr. 2002.*

IBM AS/400e Logical Partitions: Learning About. © 1999, 2000. http://publib.boulder.ibm.com/pubs/html/as400/v4r5/ic2924/info/rzajx.pdf.*

IBM AS/400e Logical Partitions: Planning for. © 1999, 2000. http://publib.boulder.ibm.com/pubs/html/as400/v4r5/ic2924/info/rzait.pdf.*

IBM AS/400e Logical Partitions: Creating. © 1999,2000. http://publib.boulder.ibm.com/pubs/html/as400/v4r5/ic2924/info/rzaj7.pdf.*

IBM AS/400e Logical Partitions: Managing. © 1999,2000. http://publib.boulder.ibm.com/pubs/html/as400/v4r5/ic2924/info/rzaj6.pdf.*

IBM AS/400e Logical Partitions: Troubleshooting. © 1999, 2000. http://publib.boulder.ibm.com/pubs/html/as400/v4r5/ic2924/info/rzaj8.pdf.*

Marisa Gil, Xavier Martorell, Nacho Navarro; The Enhancement of a User–Level Thread Package Scheduling on Multiprocessors; Sep. 1994; Euromicro Workshop on Parallel and Distributed Processing; pp. 228–236.

Ayachi et al., "A Hierarchical Processor Scheduling Policy for Multiprocessor Systems", 1996 IEEE, pp. 100–109.

Bakshi et al., "Partitioning and Pipelining for Performance–Constrained Hardware/Software Systems", 1999 IEEE, pp. 419–432.

David L. Black, "Scheduling Support for Concurrency and Parallelism in the Mach Operating System," Computer, IEEE Computer Society, vol. 23, No. 5, May 1, 1990 pp. 35–43 .

T. L. Borden et al., "Multiple Operating Systems on One Processor Complex," IBM Systems Journal, vol. 28, No. 1, 1989, pp. 104–122.

Shigekazu Inohara et al., "A Thread Facility Based on User/Kernel Cooperation in the XERO Operating System," Computer Software and Applications Conference, 1991, Sep. 11, 1991, pp. 398–405.

U.S. Appl. No. 09/838,057, entitled "Method and Apparatus for Allocating Processor Resources in a Logically Partitioned Computer System," filed Apr. 19, 2001.

U.S. Appl. No. 09/939,232, entitled "System for Yielding to a Processor," filed Aug. 24, 2001.

U.S. Appl. No. 09/939,235, entitled "Yield on Multithreaded Processors," filed Aug. 24, 2001.

IBM Corporation, S/390 Processor–Resource/Systems Manager Planning Guide (IBM Pub. No. GA22–7236–04, 5$^{th}$ Edition, Mar. 1999).

* cited by examiner

TECHNIQUE FOR CONFIGURING PROCESSORS IN SYSTEM WITH LOGICAL PARTITIONS

BACKGROUND OF THE INVENTION

1. Field of The Invention

The invention relates to the field of multiprocessing, and in particular, to the distribution of resources on a system where multiple operating system images (same or different) are involved.

2. Background Information

In early computer systems, a single set of program instructions was used to control the basic computer system operations such as input/output, disk access, etc. This set of program instructions was referred to as the 'operating system.' Early computers also generally had only a single central processing unit or CPU where the program instructions were executed. Modern computer systems often have multiple processing units and/or are capable of running multiple operating systems at the same time. Each of the multiple operating systems running on such a modem computer may be confined to operate in a respective logical partition, i.e., an processing space reserved for that operating system. In a shared system, one user may be running the Windows operating system, while another user may be running Unix, for example. Also, there could be multiple users running the same operating system, e.g., Unix, but each running their own copy or 'image' in different respective partitions of the system. These partitions serve to prevent the operating systems running concurrently from interfering with each other.

On a modern computing system running multiple operating system images (i.e., the same operating system or different operating systems) as logical systems in respective partitions, one of the key items to be distributed between each logical system is processing resources. These resources can be dedicated to a particular partition or shared among multiple partitions. Configuration of these resources takes many user interface forms with GUI (graphical user interface) being the most common.

Even the earliest computer system included a rudimentary mechanism that allowed it to receive input from its users. These mechanism are often called user interfaces. The user interfaces of early computers often employed lights and switches that allowed the computer system user to communicate with the computer system in the system's native language. While this form of communication was effective, its use was essentially limited to scientists and engineers who were trained to understand the particulars of the computer system. For this reason, computer system providers moved to user interfaces that provided for entry of textual commands. While these command-based user interfaces were easier to use than their predecessors, they still typically involved a large number of commands that were often difficult for non-technical individuals to understand and remember. The shortcomings of command-based user interfaces led to the introduction of graphical user interfaces, which are often referred to as GUIs. Instead of requiring the user to have in-depth knowledge of the computer system, graphical user interfaces allow the every day user to communicate with the computer system via a pointing device such as a mouse. To use the computer system to perform various tasks, the user simply "points and clicks" on various GUI items such as icons and taskbars. These icons and taskbars are user friendly ways of activating different programs on the computer.

Techniques for managing the allocation of the processing resources within the user interface generally requires allocating a quantity of the processors. For dedicated processors, the quantity is generally a whole number representing the number of processors. For shared processors, the quantity can be either a numerical value representing both whole and partial processing units (i.e., 2.33 to describe two and a third processors) or a weighting scheme indicating a percentage of the shared processors (i.e., a partition weight of 100 with all partition weights totaling 1000 for 5 shared processors to indicated a half of a processor). These techniques are user interface independent values which could be applied to a graphical interface, a command line interface, or a menu driven text interface.

The problem with these techniques is that they do not reflect the real life situation of how users think of the processors in their system. System administrators and operators generally think of the processing capacity of their system in a workload measurement value not the number of processors.

There are many known measurements of the processing capacity of the system. One simple measure is MIPS or million instructions per second. Other more sophisticated measures are derived from industry standard workloads such as TPC-C (a specific workload defined by the Transaction Processing Performance Council) and CPW (commercial processing workload). These workloads values are generally well known for server and mainframe class systems and are commonly used to describe system performance in marketing and sales literature.

Configuring logical partitions using CPW values is a technique employed in the V5R1 logical partitioning GUI (graphical user interface). This GUI (a component of the IBM™ AS/400™ Client Access Express for Windows licensed program product), however, will not make suggestions of dedicated versus shared processors.

Therefore, a way to overcome the above problems which would enable system administrators to configure processors for logical partitions using a capacity-based measurement, and which would suggest whether to use dedicated or shared processors, would make the computer systems more user friendly and the system administrators more productive.

SUMMARY OF THE INVENTION

It is, therefore, a principal object of this invention to provide a method and apparatus for configuring processors in a system with logical partitions It is another object of the invention to provide a method and apparatus that solves the above mentioned problems so that configuration of logical partition processors is simplified.

These and other objects of the present invention are accomplished by the method and apparatus disclosed herein.

According to an aspect of the invention, a capacity-based measurement technique is used to configure processors for logical partitions.

According to an aspect of the invention, instead of specifying a quantity of processing units for a logical partition, the user interface accepts a processing capacity value in units of work, such as CPW or TPC-C, or any well-defined workload measurement units.

According to an aspect of the invention, an exemplary routine for implementing the invention includes allowing a user to select the units to use for configuring the processors, e.g., CPW or TPC-C, or any well-defined workload measurement units.

According to an aspect of the invention, the exemplary routine also prompts the user for the quantity of processing power required, i.e., the partition workload capacity required. These two steps can be combined into one step depending on the design of the user interface. That is, the user can be prompted to fill-in the numerical quantity and units on the same screen, or to fill-in the numerical value next to the appropriate units to be used, for example.

According to an aspect of the invention, using a look-up table, for example, the system work capacity for the target system is obtained in the appropriate units from the preceding steps.

According to an aspect of the invention, the number of partition processors is then calculated using the formula the number of partition processors equals the total number of system processors, times the partition workload capacity divided by the system work capacity.

According to an aspect of the invention, the resolution for the number of partition processors result is preferably two digits to the right of the decimal, i.e., two decimal places.

According to an aspect of the invention, the calculated number of partition processors is then tested to see if it is within a predetermined percentage, e.g., twenty-five percent, of the next full processor increment. If within the predetermined percentage, then the routine recommends using dedicated processors. Otherwise, using shared processors is recommended.

According to an aspect of the invention, the calculated number of partition processors and the recommended mode, i.e., shared versus dedicated processors, are displayed to the user so that the user can validate or change the values.

According to an aspect of the invention, after validation, the processors are configured according to the settings determined by the routine.

According to an aspect of the invention, a system administrator enters the partition's processing capacity, and the user interface and logical partition management code performs any necessary calculations to determine the number of processing units.

According to an aspect of the invention, dedicated or shared processing resources may be recommended based on predetermined criteria.

According to an aspect of the invention, the technique is independent of the type of user interface.

According to an aspect of the invention, the configuration of logical partition processors is simplified by utilizing output from the manual system planning exercise (a workload capacity value) into configuration for the partition directly without any intermediate calculations.

These and other aspects of the invention will become apparent from the detailed description set forth below.

Detailed Description of the Preferred Embodiment(s)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

This invention relates to a technique of using a capacity-based measurement to configure processors for logical partitions. Instead of specifying a quantity of processing units for a logical partition, the user interface accepts a processing capacity value in units of work like CPW or TPC-C, or any well-defined workload measurement units.

For example, a server system may have 2 processors and be capable of 1000 CPW. The system administrator wants to create a logical partition to support a 250 CPW workload.

To implement this partition using existing user interface techniques, the system administrator would need to utilize the following formula:

number of partition processors=(total number of system processors) * (partition workload capacity)/(system work capacity)

This would indicate that 0.5 processing units or half a processor are required.

To implement this partition using the invention technique, the system administrator would enter the partitions processing capacity in CPW as 250. The user interface and logical partition management code would then perform any necessary calculations to determine the number of processing units and could even suggest dedicated or shared processing resources.

This technique is independent of the type of user interface.

Figure 1:
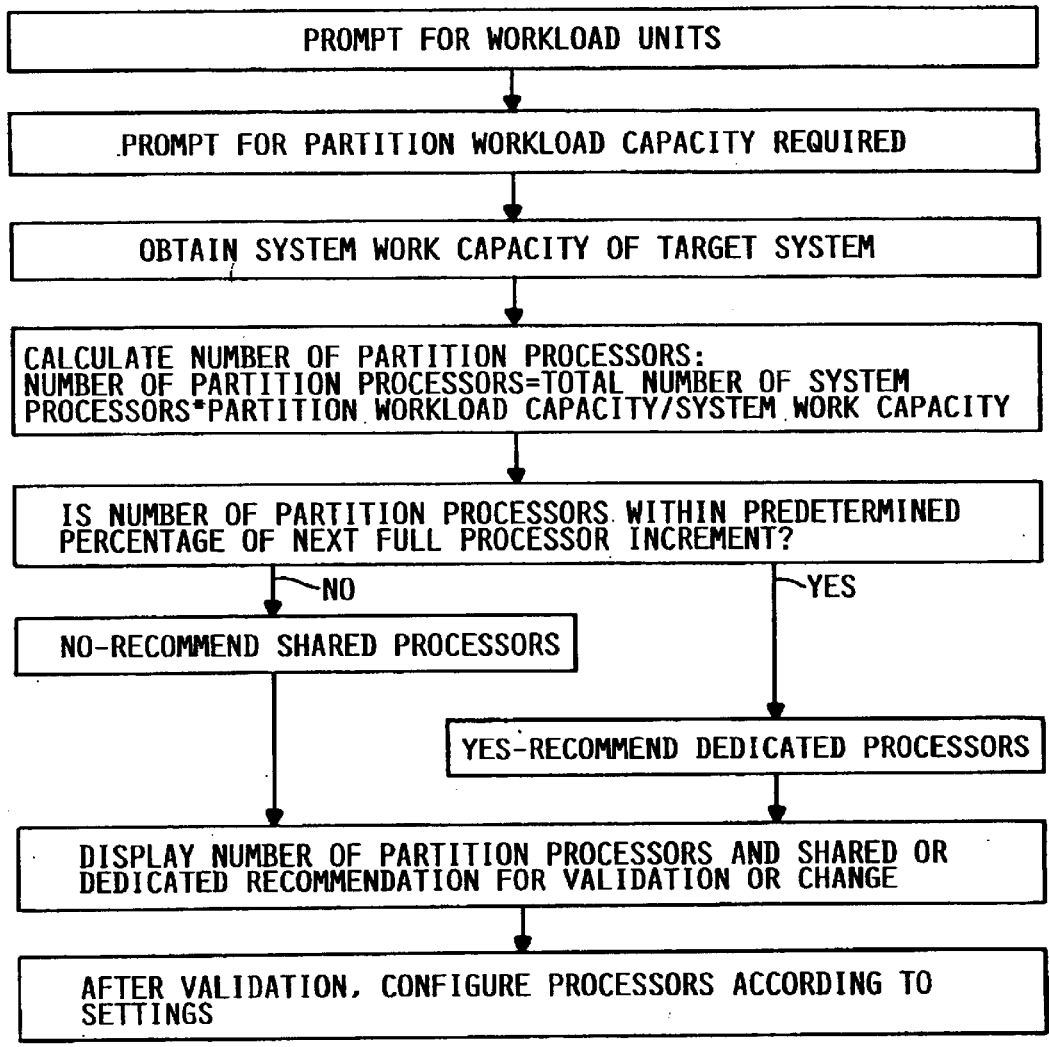
FIG. 1 illustrates a flow chart of a process according to an exemplary embodiment of the present invention.

An exemplary routine for implementing the invention could take the following form, as illustrated in FIG. 1. The routine initially allows the user to select the units to use for configuring the processors, e.g., CPW or TPC-C, or any well-defined workload measurement units. The routine also prompts the user for the quantity of processing power required, i.e., the partition workload capacity required. These two steps could be combined into one step depending on the design of the user interface. That is, the user could be prompted to fill-in the numerical quantity and units on the same screen, or to fill-in the numerical value next to the appropriate units to be used, for example.

The user selections are limited by what types of units are used in the look-up table. If a new workload standard were to be used, the user interface could be adapted and the table changed.

Using a look-up table, for example, the system work capacity for the target system is obtained in the appropriate units from the preceding steps. The context indicates the model of the target system.

If the target system model is not stored in the database, the user can enter the system work capacity manually, e.g., from sale literature.

For the next calculation, the partition workload capacity and the system workload capacity are expressed using the same units, e.g., both in TPC-C or CPW, or any well-defined workload measurement units.

The system work capacity of the target system is stored on the target system or the configuring system.

Systems generally come with this value pre-stored somewhere onboard, e.g., in VPD (vital Product Data) storage, or VPD can enable 'client' lookup, i.e., system model 'xyz'= 123 CPW, for example, model vs. capacity. However, one skilled in the art would understand that there are many different ways in which the system capacity could be stored and accessed.

There is no conversion formula for converting from one unit of processing capacity to another. The table would store capacity values in all the different units needed.

The number of partition processors is then calculated using the formula previously described, i.e., the number of partition processors equals the total number of system processors, times the partition workload capacity divided by the system work capacity. The resolution for the result would preferably be two digits to the right of the decimal.

Then the calculated number of partition processors is tested to see if it is within a predetermined percentage, e.g., twenty-five percent, of the next full processor increment. If within the predetermined percentage, then the routine will recommend using dedicated processors. For example if the result were 0.80 partition processors then dedicated processors would be recommended. Otherwise, using shared processors would be recommended. The factors that determine the percentage to use as a test for shared processors are based on a definition of what is considered 'reasonable.' A good user interface allows selecting this value under an "Advanced" parameter.

The calculated number of partition processors and the recommended mode, i.e., shared versus dedicated processors, is displayed to the user so that the user can validate or change the values. After validation, the processors are configured according to the settings determined by the routine. This invention simplifies the configuration of logical partition processors.

Figure 2:
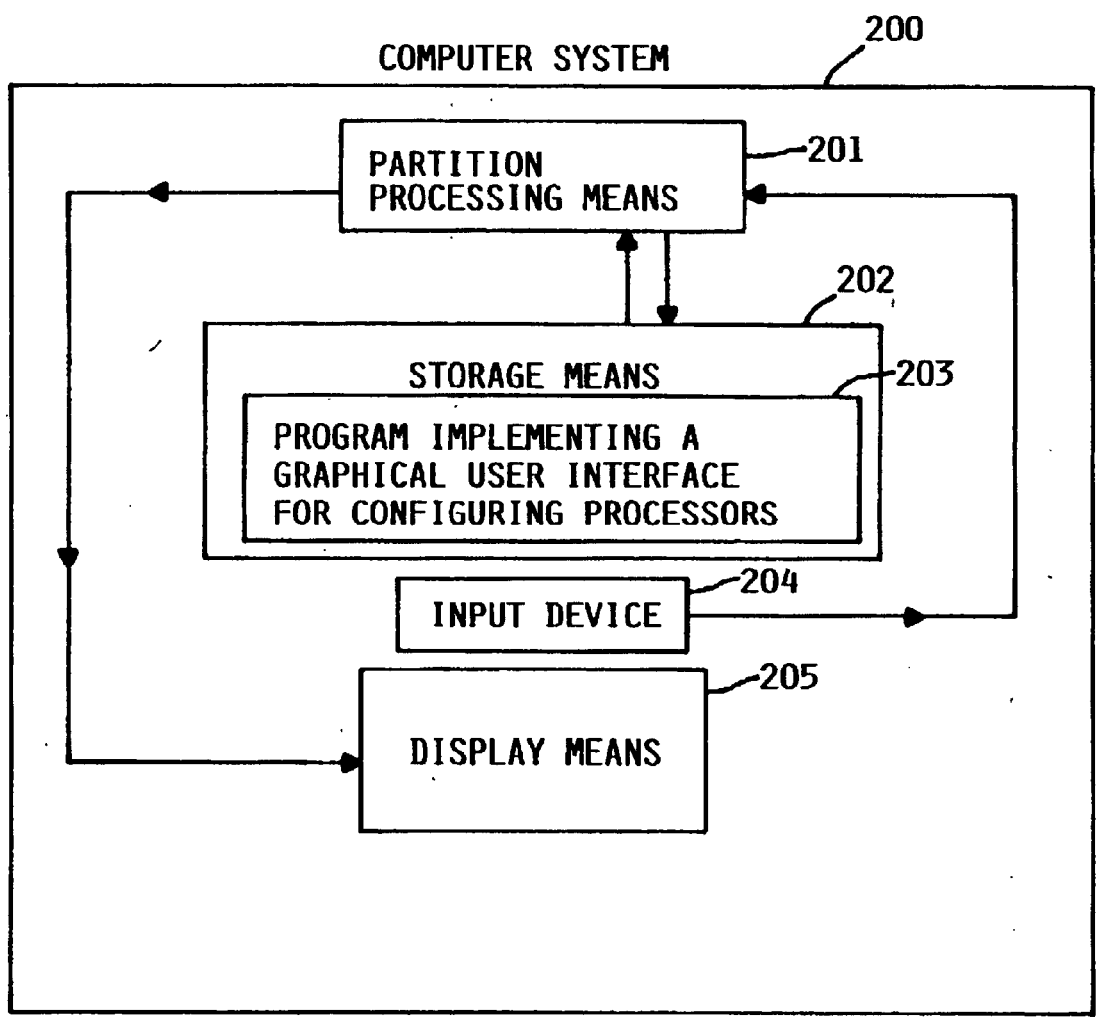
FIG. 2 is a block diagram of a computer system for implementing a technique for configuring processors according to an exemplary embodiment of the invention.

FIG. 2 is a block diagram of a basic computer system 200 for implementing a technique for configuring processors according to an exemplary embodiment of the invention. The basic computer system 200 includes partition processing means 201, storage means 202 in which a program implementing a graphical user interface for configuring processors 203 as described above is disposed, an input device 204, e.g., mouse and/or keyboard, and a display means 205.

The invention may be embodied as a computer program product which includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art the manner of making and using the claimed invention has been adequately disclosed in the above-written description of preferred embodiments taken together with the drawings. The above-described preferred embodiments of the invention are susceptible to modifications, changes, and adaptations, and the same are intended to be comprehended within the meaning and range of equivalents of the appended claims. Although equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A computerized method of configuring processors in a target system, comprising:

prompting a user to select workload units to use in the configuration of the processor in the target system;

prompting the user to input a quantity of processing power required in terms of partition workload capacity required;

obtaining a system work capacity for the target system in the appropriate units from a look-up table;

calculating the number of partition processors;

wherein the number of partition processors equals the total number of system processors, times the partition workload capacity divided by the system work capacity;

testing the calculated number of partition processors to see if it is within a predetermined percentage of the next full processor increment;

if within the predetermined percentage, then recommending using dedicated processors, otherwise recommending using shared processors;

displaying the calculated number of partition processors and the recommended use of dedicated or shared processors to the user for validation or changing of the values; and after validation, configuring the processors according to the calculated number of partition processors and the recommended use, based on the quantity of processing power required in terms of the partition workload capacity required.

2. The method according to claim 1, wherein the workload units to use in the configuration of the processor in the target system are in commercial processing workload (CPW) units, transaction processing performance council (TPC-C) units.

3. The method according to claim 1, wherein the number of partition processors calculated has a resolution of at least two digits to the right of the decimal.

4. The method according to claim 1, wherein the predetermined percentage of the next full processor increment is twenty-five percent.

5. A processing system running multiple operating system images (same or different) having logical partitions and implementing the method according to claim 1.

6. A computer program product, comprising:

a recording medium; and instruction means, disposed on the recording medium, for causing a computer to implement the method of configuring processors in a target system according to claim 1.

7. A computer system having processing means, storage means, input means, and display means, and operating a graphical user interface utilizing the method according to claim 1.

8. A graphical user interface comprising:

means for prompting a user to select workload units to use in configuration of processors in a target system;

means for prompting the user to input a quantity of processing power required in terms of partition workload capacity required;

means for obtaining a system work capacity for the target system in the appropriate units from a look-up table;

means for calculating the number of partition processors;

wherein the number of partition processors equals the total number of system processors, times the partition workload capacity divided by the system work capacity;

means for testing the calculated number of partition processors to see if it is within a predetermined percentage of the next full processor increment;

means for recommending using dedicated processors if within the predetermined percentage, and otherwise recommending using shared processors;

means for displaying the calculated number of partition processors and the recommended use of dedicated or shared processors to the user for validation or changing of the values; and means for configuring the processors according to the calculated number of partition processors and the recommended use, based on the quantity of processing power required in terms of the partition workload capacity required.

9. The graphical user interface according to claim 8, wherein the workload units to use in the configuration of the processor in the target system are in commercial processing workload (CPW) units, transaction processing performance council (TPC-C) units.

10. The graphical user interface according to claim 8, wherein the number of partition processors calculated has a resolution of two digits to the right of the decimal.

11. The graphical user interface according to claim 8, wherein the predetermined percentage of the next full processor increment is twenty-five percent.

12. A processing system running multiple operating system images (same or different) having logical partitions and implementing the a graphical user interface according to claim 8.

13. A computer program product, comprising:

a recording medium; and instruction means, disposed on the recording medium, for causing a computer to implement the graphical user interface according to claim 8.

14. A computer system comprising:

partition processing means for running multiple operating system images;

storage means for storing a program and data;

an input device for inputting data; and display means for displaying a graphical user interface to a user;

wherein the program implements the graphical user interface for configuring processors, wherein the program when executed on one of the processors comprises, prompting the user to select workload units to use in the configuration of the processors;

prompting the user to input a quantity of processing power required in terms of partition workload capacity required;

obtaining a system work capacity for the computer system in the appropriate units from a look-up table;

calculating a number of partition processors, wherein the number of partition processors equals a total number of the processors multiplied by a partition workload capacity and divided by a system work capacity;

testing the calculated number of partition processors to determine if it is within a predetermined percentage of a next full processor increment;

if within the predetermined percentage, then recommending using dedicated processors, otherwise recommending using shared processors, displaying the calculated number of partition processors and the recommended use of dedicated or shared processors to the user for validation or change; and after validation, configuring the processors according to the calculated number of partition processors and the recommended use, based on the quantity of processing power required in terms of the partition workload capacity required.

* * * * *